UNITED STATES PATENT OFFICE.

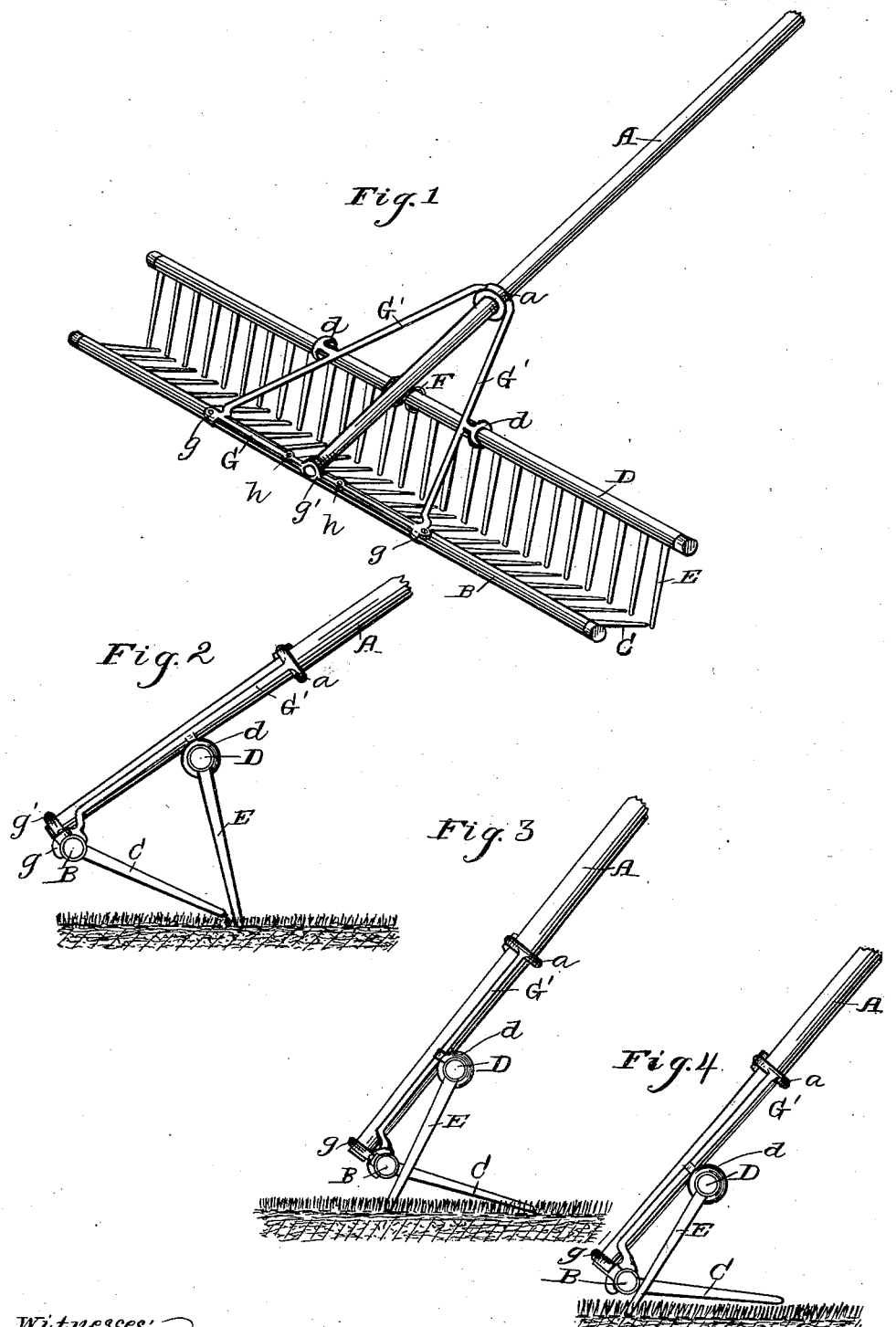

HENRY FISHER, OF CANTON, OHIO.

RAKE.

SPECIFICATION forming part of Letters Patent No. 349,703, dated September 28, 1886.

Application filed December 10, 1885. Serial No. 185,266. (No model.)

*To all whom it may concern:*

Be it known that I, HENRY FISHER, a citizen of the United States, residing at Canton, in the county of Stark and State of Ohio, have invented certain new and useful Improvements in Rakes, of which the following is a specification, reference being had therein to the accompanying drawings.

My invention relates to certain improvements upon hand-rakes, particularly that class wherein a clearing device is used, adapted to free the teeth from accumulated material.

Figure 1 is a perspective view of a rake having my invention applied thereto. Figs. 2, 3, and 4 are side elevations showing different positions of the parts.

In the drawings, A represents the handle, B the rake-head, and C the teeth supported therein, these parts being of any usual or preferred construction.

G G' G' is a casting of triangular form serving to brace and connect together the parts of the rake. The part G lies parallel with the rake-head, to which it is secured by screws *h* or otherwise, and is provided with seats *g g* for the rake-head, and with a seat or circular eye, *g'*, for the lower end of the handle. The parts G' G' serve as the braces between the rake-head and the handle. At the point where the two parts G' G' join there is formed an eye, *a*, through which the handle passes.

At *d d*, intermediate between the ends of the parts G' G', there are formed circular seats or eyes, in which is mounted a rocking bar or head, D, to be hereinafter described.

The above-described bracing and connecting piece is cheap in construction and enables me to make the rake very rigid, while avoiding the necessity of mortising the rake-head to receive the handle and braces, and consequently weakening it, as has heretofore been customary. It is made from either cast or malleable iron, the latter being sometimes preferable, as thereby I am enabled to change the shape of the seats for the rake-head and rocking bar, or to open the eyes *d d* in order to remove the bar D, should it become necessary.

D is a rocking bar or head mounted in the aforesaid eyes *d d*, it being parallel to and of substantially the same length as the rake-head B. It is provided with clearer teeth or fingers E E, each adapted to lie between two adjacent teeth, C C, of the rake.

F is a spring attached to some stationary part of the rake—preferably the handle—and bearing against the clearer, which it tends to rock, so as to throw the teeth E into the position shown in Figs. 1 and 2—that is, out from between the rake-teeth C. From an examination of these figures, wherein the parts are shown in the positions occupied at the moment the operator begins to draw the rake toward himself, it will be seen that the teeth C are inclined relatively to the ground, as is ordinary in hand-rakes, while the teeth E are substantially perpendicular, their ends being in proximity to but extending somewhat below the ends of teeth C. This insures that the fingers or teeth E shall engage with the ground before teeth C, and that a movement of the rake toward the operator will cause the bar D to rock and the teeth E to move up close under the rake-head B, as shown in Fig. 3, which position they will occupy until the rake is lifted or moved back away from the operator, when the spring F will rock the head D and move the teeth E out from between the rake-teeth, thus cleaning them from all accumulated material. This arrangement is particularly advantageous, as the rake-teeth are cleared at each movement of the rake, and this is accomplished without any unusual movements upon the part of the operator to effect it, as has heretofore been necessary. This is insured, first, by reason of the clearer-teeth projecting below the rake-teeth, whereby they are moved up close under the rake-head before the rake-teeth begin to operate, thus insuring that all material gathered by the rake shall lie below and in front of the clearer-teeth, which will form a guard to prevent the rake from overflowing, and, secondly, by reason of the spring F forcing the teeth E from between the rake-teeth, thus clearing them as soon as relieved from contact with the ground.

My invention is particularly adapted for use upon lawn-rakes, wherein the teeth are set close together and are frequently quite sharp. I therefore prefer to mount the bar D below the rake-handle, in order that the teeth or fingers E may be set sufficiently close together without interference from the handle and braces G' G', as would be the case were the bar mounted upon the upper side of the handle.

It is often desirable, particularly when using the rake upon a lawn, to so hold it that the teeth shall slide over the surface without digging into the ground, or penetrating the grass so far as to become entangled therein. This I easily insure by tipping the rake-handle upward slightly, as shown in Fig. 4, when the ends of teeth E will ride upon the surface being raked, and act as a gage to prevent the teeth C from penetrating too deeply. Each eye d lies between two of the teeth E, and serves to prevent longitudinal movement of the bar D, and to properly space the bar so as to insure that the fingers E shall at all times pass between the teeth C when rocked away from the operator.

I do not wish to be limited to all the details of construction shown. For instance, an ordinary handle-brace might be substituted in place of the one shown, and the rake still retain many of the features of my invention; or the bar D might be mounted above the handle, and other changes might be made without departing from the spirit of my invention.

I am aware that rakes have been provided with various devices by which the teeth are cleared or freed from dirt, leaves, &c. For instance, perforated clearer-plates have been arranged to slide over the rake-teeth to remove any substance which might lodge between them. With these perforated plates have been combined springs, which tend to force them toward the points of the rake-teeth, while teeth or standards of substantially the length of the rake-teeth have been secured to the ends of such clearer-plates, they being adapted to engage with the ground when the rake is in use, to force the plate up away from the points of the teeth. All such devices I disclaim, as forming no part of my invention; but I believe that I am the first to have combined with a rake a rocking bar mounted parallel with the rake-head, and carrying a series of clearer-teeth adapted to be moved between the rake-teeth, and a spring which tends to force the clearer-teeth from between the rake-teeth, whereby the latter are automatically freed from whatever may have accumulated between them. I make the clearer-teeth of such length that they normally—that is, when from between the rake-teeth—project below the ends thereof, whereby the clearing devices themselves engage with the ground, and are positively forced into position to clear the teeth each time the rake is used.

My arrangement of parts enables me to make the rake-head and its teeth and the rocking bar and its teeth counterparts one of the other, thus facilitating and cheapening the cost of manufacture.

What I claim is—

1. In combination with a rake, a clearer consisting of a rocking bar carrying teeth adapted to project between the rake-teeth, and a spring which tends to rock the bar and move the clearer-teeth from between the rake-teeth, substantially as set forth.

2. In combination with a rake, a clearer consisting of a rocking bar carrying teeth adapted to project between the rake-teeth, and which normally extend below the ends of the rake-teeth, whereby when the rake is drawn toward the operator they engage with the ground before the rake-teeth and are rocked backward between the rake-teeth, substantially as set forth.

3. In combination with a rake, a clearer consisting of a rocking bar carrying teeth adapted to project between the rake-teeth, and which normally extend below the ends of the rake-teeth, whereby when the rake is drawn toward the operator they engage with the ground before the rake-teeth and are rocked into a position between the rake-teeth, and a spring which tends to rock said bar and move its teeth from between the rake-teeth, substantially as set forth.

4. In combination with a rake-handle and a rake-head carrying the teeth, the herein-described triangular casting, consisting of the braces G' G' and the part G, parallel with the rake-head, the part G carrying seats g g, in which is supported the rake-head, and being provided with an eye, g', for the end of the handle, and there being an eye, a, for the handle at the point where the braces G' G' join, substantially as set forth.

5. In combination with a rake and a clearer consisting of a rocking bar carrying teeth adapted to project between the rake-teeth, the herein-described casting G G' G', provided with seats g g for the rake-head, seats or eyes g' a for the handle, and seats d d, in which is mounted the rocking bar, substantially as set forth.

In testimony whereof I affix my signature in presence of two witnesses.

HENRY FISHER.

Witnesses:
JACOB P. FAWCETT,
LEONARD BETZ.